United States Patent [19]

Gebelius

[11] 4,205,697
[45] Jun. 3, 1980

[54] METHOD TO INTERRUPT A MEDIA FLOW THROUGH A TUBULAR PIPE AND A DEVICE FOR UTILIZING THE METHOD

[76] Inventor: Sven R. V. Gebelius, Fridhemsgatan 27, Stockholm, Sweden, S-112 40

[21] Appl. No.: 906,609

[22] Filed: May 16, 1978

[30] Foreign Application Priority Data

May 16, 1977 [SE] Sweden .................................. 7705853

[51] Int. Cl.² ........................ F16L 55/12; F16K 13/06
[52] U.S. Cl. ......................................... 137/15; 29/254;
83/54; 89/1 B; 137/68 A; 137/318; 138/89;
251/4; 251/5
[58] Field of Search ......................... 29/254, 255, 421;
72/56; 83/54, 639; 89/1 B; 102/30; 137/15, 68
R, 68 A, 318; 138/89; 251/4, 5

[56] References Cited

U.S. PATENT DOCUMENTS

| 2,763,282 | 9/1956 | Reedy et al. ....................... 137/318 |
| 2,924,147 | 2/1960 | Bohl et al. ............................ 89/1 B |
| 2,964,290 | 12/1960 | Mueller ................................ 137/318 |
| 3,101,733 | 8/1963 | Lord ................................... 137/68 A |
| 3,854,694 | 12/1974 | Coone ....................................... 251/5 |
| 3,863,667 | 2/1975 | Ward ..................................... 137/318 |
| 3,983,897 | 10/1976 | Gebelius ............................... 137/318 |
| 4,034,777 | 7/1977 | Gebelius ............................... 137/318 |

Primary Examiner—Irwin C. Cohen
Assistant Examiner—G. L. Walton
Attorney, Agent, or Firm—Holman & Stern

[57] ABSTRACT

A method and a device for interrupting or reducing a media flow through a tubular pipe, involving removal of two opposed circumferential wall portions of the tubular pipe by means of two mainly parallel pistons, thereafter moving a third piston mainly mutually perpendicularly to the direction of travel for the pistons parallel piston and the length axis of the tubular pipe to a position mainly extending through the parallel pistons, the tubular pipe and the opposed openings of same, the third piston means being arranged with expanding devices, which, after completed movement of the third piston, are expanded to reduce, or interrupt, the internal cross-sectional area of the tubular pipe.

26 Claims, 11 Drawing Figures

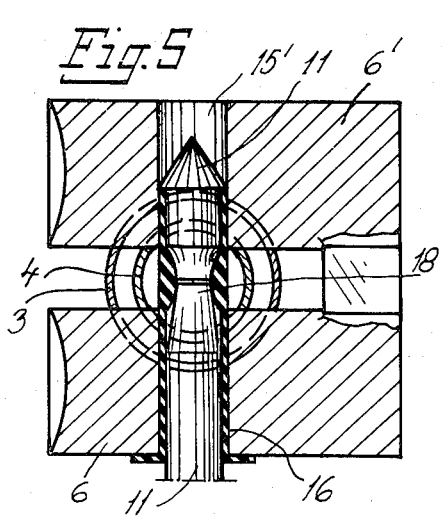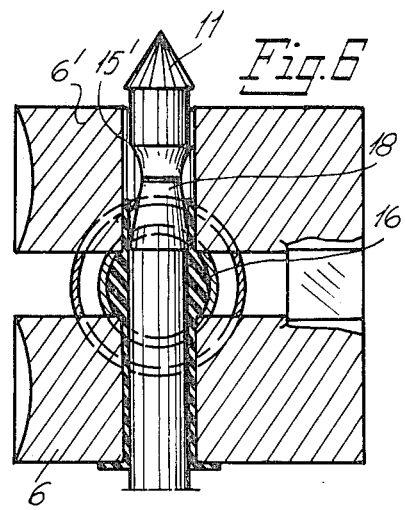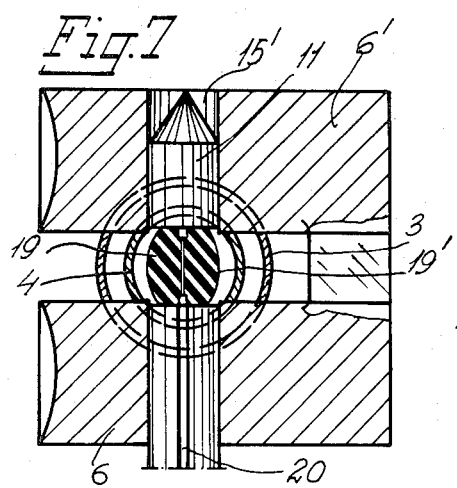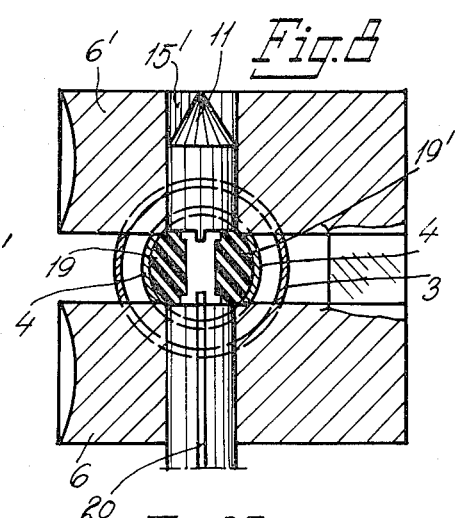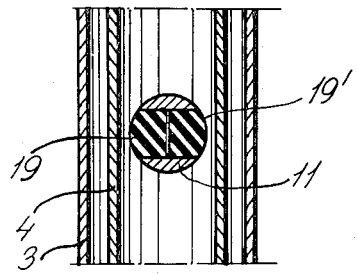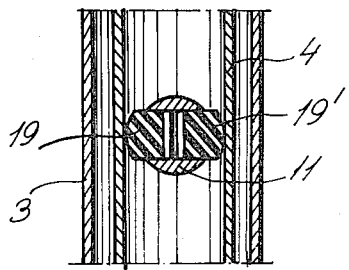

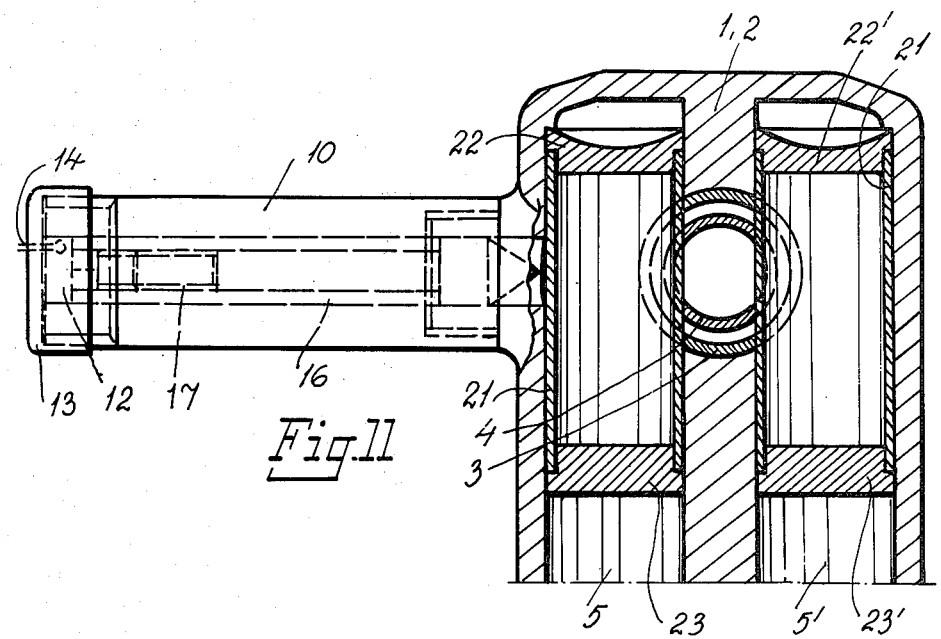

METHOD TO INTERRUPT A MEDIA FLOW THROUGH A TUBULAR PIPE AND A DEVICE FOR UTILIZING THE METHOD

BACKGROUND OF THE INVENTION

The present invention relates to a method to interrupt a media flow through a tubular pipe and a device for utilizing the method.

It is previously known to use various types of valve means to reduce or interrupt a media flow through a tubular pipe. However, these valve means can only be attached to the pipe when the pipe is installed, or, when the pipe is not being utilized for transport of a media flow, unless the type of medium and flow and pressure conditions permit leakage during the time when a portion of the pipe is removed and replaced by a valve means, attached to the pipe as replacement for the removed portion. Such a method can only be utilized in cases involving relatively low pressure and flow speeds, and when the type of medium and the environment permits use of a method involving leakage. Furthermore, such a method of installation is obviously extremely difficult to perform.

OBJECT OF THE INVENTION

The object of the present invention is to disclose a method, and a device for utilizing the method, whereby it is possible to reduce or interrupt a continuous media flow through a pipe, regardless of the type, pressure and speed of flow for the medium. The interruption is also achieved in a minimum of time, effectively, completely without leakage, and the point of interruption can be chosen at random and without preventing the pipe from being used for the intended purpose, i.e. in cases where it is desirable to achieve a temporary interruption of the flow. It is easily realized, that the method and the device according to the present invention thus provides for an extremely large demand, e.g. to accomplish interruption of a media flow such as oil and/or gas leaking from pipe lines connected to maritime oil rings. It is thus possible to prevent damage caused by leakage, and also to extinguish fires at oil or gas wells most effectively, by interrupting the oil and/or gas flow from the well. As an example of further fields of use, the possibility to block a pipe can be mentioned, e.g. used for transport of hot water to radiators arranged within a specific area, e.g. an apartment, and thereafter to connect a flow depending metering means between a point before, respectively after, the point of interruption. It is thus possible to include various types of metering means in existing plumbing installations, e.g. for metering of hot water or heating comsumption, without interrupting the operation of the system.

The method according to the present invention is mainly characterized by the features disclosed in the following main claim, and the device for utilizing the method is mainly characterized by the features disclosed in the subclaims relating to the device according to the present invention.

In order to simplify the understanding the the invention, a number of embodiments for utilizing the method according to the present invention are described below by way of example, the embodiments being shown in connection with a first pipe, surrounded by a second pipe, intended to illustrate the type of tubular pipes generally used for transport of oil and/or gas from maritime wells, connected with an oil rig by means of double pipes, said first and surrounded pipe being the transport pipe for an oil and/or a gas flow. However, it should be emphasized, that the method and the device according to the invention can also be utilized in connection with a single pipe, without a surrounding second pipe.

BRIEF DESCRIPTION OF THE DRAWINGS

FIG. 5 is a principal cross-sectional view of a slightly modified embodiment of a device according to the present invention, arranged to partially interrupt a media flow through the inside and surrounded pipe.

FIG. 6 is a principal cross-sectional view corresponding to FIG. 5, the cross-sectional area of the inside pipe, and thus also the media flow, being totally interrupted.

FIG. 7 is a further principal cross-sectional view of a further modified embodiment, arranged to partially interrupt a media flow.

FIG. 8 is a cross-sectional view corresponding to FIG. 7, the device being arranged to completely interrupt the cross-sectional area of the pipe, and thus also the media flow through the pipe.

FIG. 9 is a longitudinal extending section of the embodiment as shown in FIG. 7.

FIG. 10 is a longitudinal extending section of the embodiment as shown in FIG. 8.

FIG. 11 is a partial cross-sectional view of a further modified embodiment of a device according to the present invention, shown immediately before the operation when a substantial reduction of the cross-sectional area of the pipe is achieved.

DETAILED DESCRIPTION OF PREFERRED EMBODIMENTS

Figure 1:
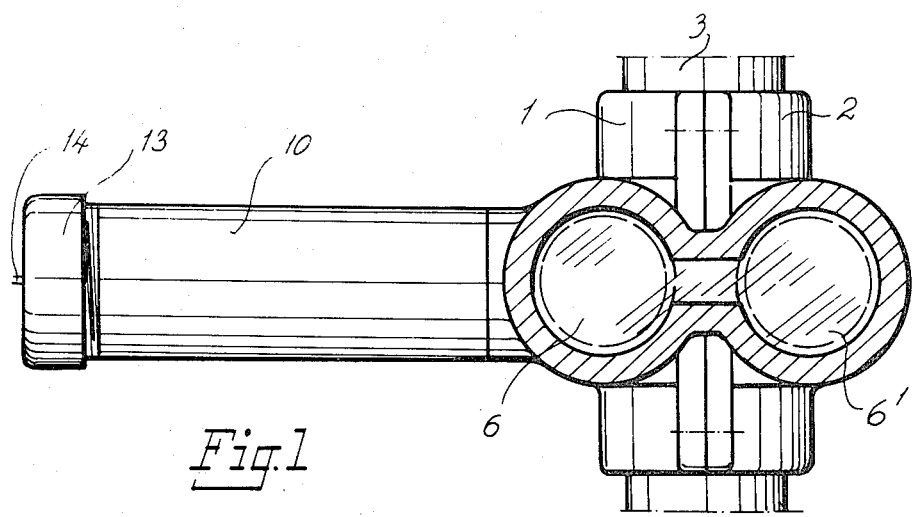
FIG. 1 shows, partly in section, divided at a sectional line I—I in FIG. 2, a side view of a device according to the present invention arranged on a vertically extending pipe.
Figure 2:
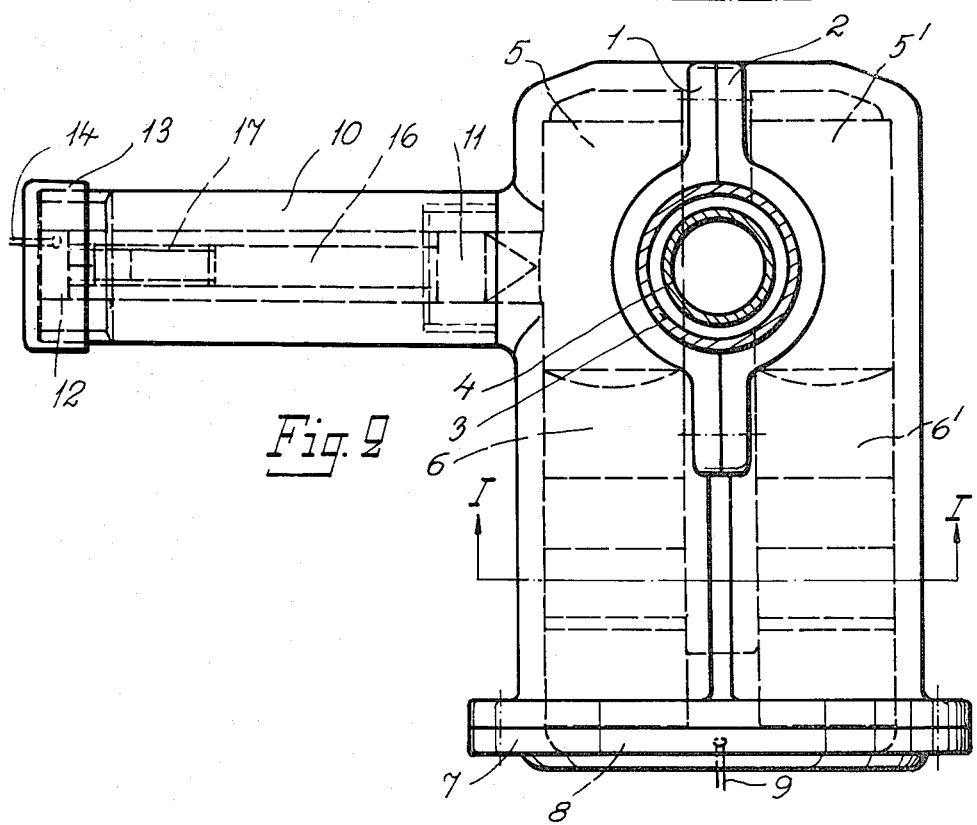
FIG. 2 shows a plan view of the device according to FIG. 1.

With reference to the figures, reference numerals 1 and 2 indicate two housing parts, which can be joined to each other by means of a screw or a bolt connection or similar, thus arranged to sealingly embrace a pipe 3, which in the shown embodiment surrounds a second pipe 4. The second pipe 4 is a transport pipe for the media flow to be interrupted. In order to simplify the drawing figures of the device, the housing parts 1, 2 have been indicated with similar cross-sectional lines, and certain dividing lines are not shown. However, said dividing line is shown in FIGS. 1 and 2, showing flanges to be connected, and the dividing line extends through the housing 1, 2 along the dividing line for said flanges. The housing 1, 2, extends in direction from the pipe 3, 4, and includes two parallel and preferably cylindrical holes 5, 5', which serve as guiding cylinders for two piston means 6, 6', arranged movably in said holes or cylinders 5, 5'. The distance between said holes 5, 5' is so arranged, that the adjacent peripheral portions area arranged at a distance from each other smaller than the inside diameter of the inner pipe 4. The open portions of the holes 5, 5' directed from the pipes 3, 4, are in the shown embodiments arranged closed by means of a lid 7, also being divided along the aforementioned dividing line. Between the piston means 6, 6' and the lid 7, at least one explosive charge 8 is arranged, and an activating means 9 for said charge 8 is indicated extending through the lid 7. Said activating means 9 can obviously be of mechanical, electrical or any other previously known type, depending on the method of initiation for the charge that is desired.

In a basically perpendicular relationship to the holes 5, 5' extending through the housing 1, 2 a tubular cylindrical part 10 extends from the pipes 3, 4, the length axis of said tubular part 10 being arranged corresponding to the center axis of the pipes 3, 4. Said tubular part 10 embraces and acts as a guide for a further piston means 11. A further explosive charge 12 is arranged between the end portion of said piston means 11 directed from the pipes 3, 4 and a lid 13, which seals the open end portion of the tubular part 10. Activating means 14 are also indicated at said lid 13, intended to facilitate initiation of the explosive charge 12.

With reference to the embodiment shown in FIGS. 1–4, FIGS. 1–2 show the device arranged embracing the outside pipe 3, the attachment being made by joining one housing part 1 and the tubular part 10 with the other housing part 2 by means of screws, bolts or similar. As shown in FIG. 2, all piston means 6, 6', 11 are arranged in a position adjacent to the respective lids 7, 13. The end portions of the two parallel piston means 6, 6' directed towards the pipes 3, 4 are arranged to be concave, or in any other suitable manner, in order to improve the material removing action of the piston means 6, 6' when contacting the pipes 3, 4. By influencing a first activating means 9, the explosive charge is initiated, or alternatively the explosive charges 8, which are arranged at the end portions of the piston means 6, 6' directed from the pipes 3, 4. The piston means 6, 6' are thus propelled with high speed in direction towards the pipes 3, 4, and when the front portion passes the pipes 3, 4, two opposed edge portions from the pipes 3, 4 are removed. The piston means 6, 6' are further arranged with a through hole 15, 15', said holes being arranged with the center axis to basically coincide with the center axis of the piston means 11 arranged in the tubular part 10, when the first mentioned piston means 6, 6' have completed their movement.

Figure 3:
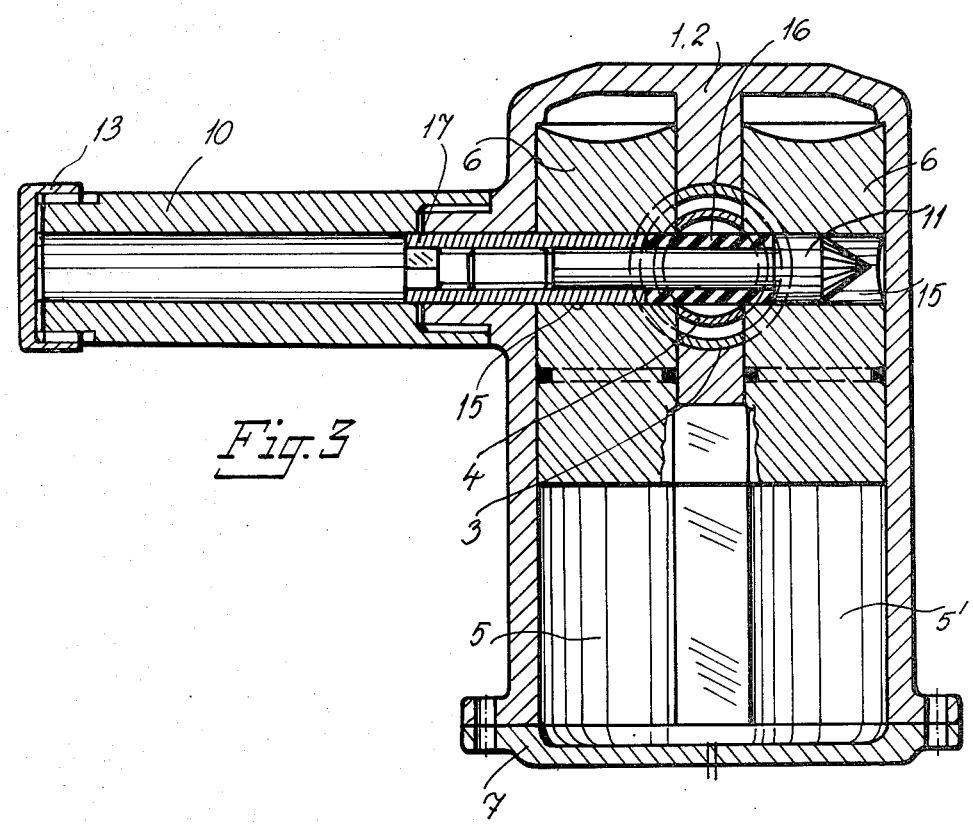
FIG. 3 is a cross-sectional view of the device disclosed in FIG. 2, said device being shown in a first and partially flow reducing position.

Thereafter, the second activating means 14 is influenced, and the explosive charge 12 arranged in the tubular part 10 is initiated, whereby the piston means 11 arranged in the tubular part 10 is brought to move with high speed in direction towards the pipes 3, 4, said piston means 6, 6', thus also through the pipes 3, 4, the through flow area thus being partially reduced, as shown in FIG. 3. According to this embodiment, the parallel piston means 6, 6' are joined to each other at the portions directed from the pipe 3, 4, said joint partly acting as a means for maintaining the axis of the through holes 15, 15' in the piston means 6, 6' in a predetermined relationship to the axis of the perpendicular piston means 11, but also maintaining a simultaneous movement of the parallel piston means 6, 6'.

With reference to FIG. 3, it is also shown that the crosswisely directed piston means 11 has a pointed part directed towards the pipes 3, 4, being followed by a cylindrical part, surrounded by a tubular means of a flexible and compressible material 16, said means 16 being arranged between the pointed part of the piston means 11 and a tubular member 17, in the embodiment joined to the piston means 11 by means of a screw thread.

Figure 4:
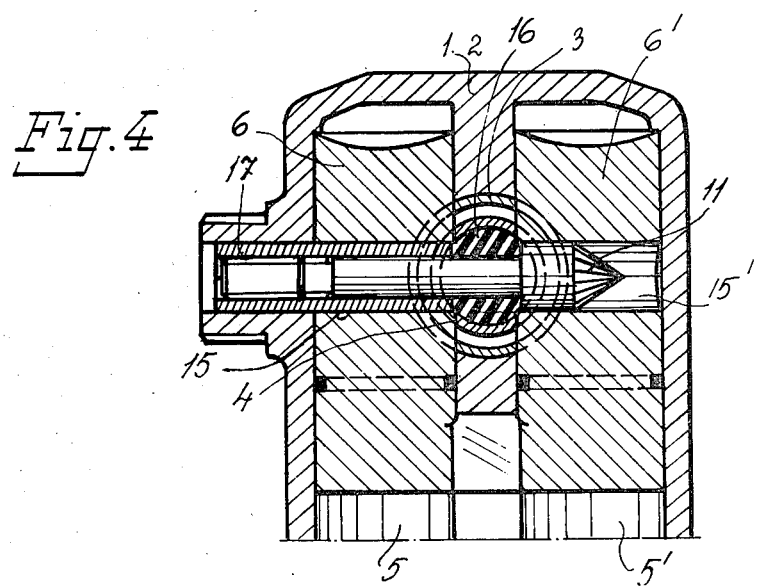
FIG. 4 is a fragment of the device shown in FIG. 3 in a corresponding cross-section, said device being arranged to totally interrupt the area of the inside pipe and thus also a media flow therethrough.

When the piston means 6, 6', 11 have been brought to take up an internally, and also in relation to the tubular pipes 3, 4, locked position, the tubular member 10 can be removed, as shown in FIG. 4, whereafter the tubular member 17 by means of a tool can be rotated in relation to the crosswisely extending piston means 11, first moving the tubular member 17 in direction towards the pointed portion of the piston means 11. The elastic means 16 surrounding the piston means 11 is thus compressed, thereby completely closing the remaining cross-sectional area of the inside pipe 4, thus also completely interrupting the media flow through said tubular pipe 4.

When desired, it is also possible to completely regain original flow capacity through the inner tubular pipe 4. In this case, the crosswisely extending piston means 11 is removed by first bringing the elastic means 16 to the original shape, by unscrewing the tubular means 17 in direction from the forward and pointed portion of the piston means, whereafter the piston means 11 is completely removed, the parallel piston means 6, 6' simultaneously being brought to take up an alternate angular position by a rotary movement, the holes 15, 15' in the piston means 6, 6' thus being prevented from communication with the inside pipe 4. The reduction in the cross-sectional area of the inside pipe 4 which is caused, is of such a small significance, that the reduction in flow capacity is negligible.

It should be emphasized, that the method also gives extremely good attachment properties against the tubular pipes 3, 4. When the parallel piston means 6, 6' are initiated, an extremely good grip with the pipe 3, 4 is obtained, and when the crosswisely directed piston means 11 is activated, such attachment properties are obtained, that the device obviously will remain in position, regardless of existing flow speed and pressure. The device is also extremely suitable for use with pipes containing oil or gas, since there is no risk for fire when attached, in view of the fact that no oxygen is available.

The embodiment shown in FIGS. 1–4 is based on the use of an elastic compressible means 16 in connection with a threaded tubular member 17 in order to obtain total interruption in the inside tubular pipe 4. An alternative embodiment is shown in FIGS. 5–6, the piston means 11 being arranged with a portion having a smaller diameter, formed by means of two conical surfaces 18, also as previously using an elastic and compressible tubular means 16 as a sealing member. According to this embodiment, the tubular means 16 is arranged with stop means, which prevent the tubular means 16 from being moved past a predetermined position. During a continued movement of the piston means 11, the elastic tubular means 16 is pressed out in the inner tubular pipe 4, thereby achieving a total sealing action.

A further alternative embodiment is shown in FIGS. 7–10, the crosswisely extending piston means 11 being arranged with two sealing piston means 19, 19', the facing surfaces by means of a channel 20, arranged in the crosswisely extending piston means 11, arranged to communicate with a medium under pressure, such as a hydraulic or pneumatic medium. Alternatively, said channel 20 can be arranged to communicate with the area behind the end portion of the crosswisely extending piston 11 directed from the pipes 3, 4, the combustion gases in said area creating a pressure forcing the sealing piston means 19, 19' to take up contact with the internal peripherial portion of the inside pipe 4. As can be easily understood, this embodiment also facilitates for a return movement, when desired, of the sealing piston means 19, 19' to a position surrounded by the crosswisely extending piston 11, e.g. by connection of the channel 20 to a vacuum source. The sealing piston means 19, 19' can also be returned by rotating the crosswisely extending piston 11, thereby first applying a pressure to one of the sealing piston means 19 from the medium in the pipe 4, whereafter a further rotary movement is carried out, approximately 180°, thereby also returning the second piston means 19'.

The above described embodiments are used as examples of various methods to accomplish total interruption when the crosswisely extending piston 11 has completed its movement, but it is easily understood, that a number of possibilities exist for accomplishing said interruption, and further examples are therefore not regarded as necessary.

FIG. 11 indicates an alternative method to arrange the parallel piston means 6, 6', thereby completely removing the need for guidance and a corresponding movement. According to this embodiment, the parallel piston means 6, 6' consist of relatively thin wall tubular members 21, 21', arranged with a relatively strong forward cutting wall 22, 22', arranged to remove two opposed wall portions of the tubular pipes 3, 4. Furthermore, a bottom part 23, 23' is shown, arranged to act as a surface against which combustion gases from the explosive charges can act, even though said bottom portions 23, 23' can be excluded in many cases. The crosswisely extending piston means 11 is arranged to penetrate the thin walls 21, 21' when the charge 12 is initiated, which means that the holes 15, 15' are completely eliminated and thereby also corresponding guiding means for the piston means 6, 6'. This embodiment facilitates also in a simpler way rotation of the piston means 6, 6', if the original cross-sectional area of the pipe 4 should be reinstated, after removal of the piston means 11.

All of the embodiments described above with reference to the accompanying drawings concern devices intended for two pipes 3, 4, the inner pipe 4 being the pipe used for transport of a medium. This has been made with regard to the fact, that the method, and devices for utilizing the method, are extremely suitable for interrupting an oil or gas flow from a damaged pipe from a well under water, since the device can be attached by means of both automatic and manual devices, in view of the fact that the device consists of two mutually joinable parts.

Even though no embodiment with one pipe only has been shown, which is a simpler case, the device can obviously also be utilized for such pipes. This fact can easily be illustrated by considering the outside pipe 3 as the outside peripheral portion of a single pipe, the single pipe, and by this example, it is easily understood, that the method, as well as described embodiments for utilizing the method, without modification can also be used for this purpose.

Particularly in connection with single pipes only, means can be arranged which partly compress the wall portions between the parallel piston means 6, 6' in direction towards each other, in which case said compression can be relatively small. This would make it possible for corresponding outside portions of the crosswisely extending piston means 11 to directly create complete sealing action and interruption of the media flow, preferably in connection with a smaller portion of the compressed tubular walls being formed, or removed, to a shape corresponding to the shape of the cross-wisely extending piston means 11.

The method according to the present invention is thus in no way restricted to the shown and described embodiments, since obviously a large number of modifications are possible within the scope of the inventive thought and the following claims.

I claim:

1. A method to reduce or interrupt a media flow through a tubular pipe having a longitudinal axis and opposed wall portions comprising removing the opposed wall portions of the tubular pipe by two mainly paralled movable means having a direction of travel mainly perpendicular to the longitudinal axis of the tubular pipe, subsequently causing a second means, having a direction of travel mainly mutually perpendicular to the direction of travel of the parallel means and to the longitudinal axis of the tubular pipe, to pass through at least one of the parallel means and the tubular pipe, and in connection therewith, or thereafter, to take up a sealing contact against the inside periphery of the tubular pipe between the parallel means.

2. A method according to claim 1, wherein said second means, movable mainly perpendicularly in relation to the parallel means, is arranged with an expandable sealing means, during the travel of the movable means through the pipe being expanded and arranged to take up a sealing contact with the inside periphery of the tubular pipe.

3. A method according to claim 1, wherein said second means, movable mainly perpendicularly in relation to the parallel means, is arranged with at least one expandable sealing means, which after completed travel of the movable means through the pipe is expanded to a sealing contact with the inside periphery of the tubular pipe.

4. A method according to claim 1, wherein said second means, movable mainly perpendicularly in relation to the parallel means, comprises two movable valve means movable oppositely from each other and perpendicular to said direction of travel of said second means, arranged to take up a sealing contact with the inner periphery of the tubular pipe under influence of a pressure acting medium applied against the valve means.

5. A method according to claim 1, wherein said mainly parallel movable means are arranged with a through hole guiding channel for said second means, and guiding means are arranged to guide said mainly parallel means in such a way, that when the guiding channel takes up a predetermined position, allowing passage therethrough of said second means.

6. A method according to claim 1, wherein said second means is arranged to take up holes for passage through at least three wall portions in the mainly parallel means, during its travel.

7. A method according to claim 1, wherein said parallel means movable in relation to the tubular pipe are arranged in two housings, said housings being arranged joinable with each other in a sealing and embracing relationship to the tubular pipe.

8. A method according to anyone of claims 1, 2, 3, 4, 5, 6 or 7, wherein said parallel means and said second means are arranged to travel in direction towards the tubular pipe under influence of initiated explosive charges, the charges for the movement of the parallel means being initiated first, and thereafter the corresponding charge for movement of said second means.

9. A method according to claim 1, wherein said parallel means are arranged to be turned or rotated to a second angular position, in connection with said second means being removed.

10. A method according to anyone of claims 1, 2, 3, 4, 5, 6 or 7, wherein said parallel, means movable in relation to the tubular pipe are arranged to penetrate two or more pipes, arranged in a basically concentrical relationship to each other.

11. A device for reducing or interrupting a media flow through a tubular pipe having a length axis, an internal diameter and wall portions comprising two mainly parallel piston means (6, 6') with an internal distance between the adjacent outside peripheral portions corresponding to, or being less than, the internal diameter of the tubular pipe (4) and having a length axis, said means (6, 6') being arranged, when travelling towards the tubular pipe (4), to remove two opposed edge portions of the tubular pipe (4), a second piston means (11) having a length axis and being arranged, when said first movement has been completed, to travel in direction towards the tubular pipe (4) and the piston means (6, 6') attached to the tubular pipe, said last movement being mainly mutually perpendicular to the length axis of the parallel piston means (6, 6') and the length axis of the tubular pipe (4), the length axis of said second piston means being arranged mainly perpendicular to the length axis of the tubular pipe (4), said second piston means (11), after completed travel through at least one of the parallel piston means (6), the tubular pipe (4) and at least part of the second parallel piston means (6'), being arranged to completely or partly prevent a media flow past the piston means (11) extending through the tubular pipe (4).

12. Device according to claim 1, wherein said second piston means (6, 6') is arranged to expand an elastic sealing means (16), arranged at the piston means (11), in the tubular pipe (4) when travelling through said pipe (4), said sealing means being arranged to take up a completely sealing contact against the inside peripheral portions of the tubular pipe (4) between the mainly parallel piston means (6, 6').

13. Device according to claim 12, wherein said sealing means (16) is arranged tubularly embracing the second piston means (11) with a portion directed towards the central part of the second piston means (11) in a preferably surrounding recess arranged at the second piston means (11), said tubular sealing means (16) being arranged with stop means, which restrict an axial movement of the sealing means (16) in relation to the movements of the embraced second piston means (11), said second piston means (11), during a movement relatively the sealing means (16), expanding the sealing means (16) to a sealing contact position against the two inside peripheral portions of the tubular pipe (4), said portions being arranged between the mainly parallel piston means (6, 6').

14. Device according to claim 11, wherein said second piston means (6, 6') is arranged with a preferably surrounding tubular member (16) of a compressible elastic material and a means (17) contactable against said member (16), arranged to compress the tubular member (16) against a stop means arranged by the second piston means (11), thereby expanding the tubular member (16) in the tubular pipe (4) to a sealing contact position against the two inside peripheral portions between the mainly parallel piston means (6, 6').

15. Device according to claim 11, wherein said second piston means (6, 6') is arranged with two valve means (19, 19'), movable in a direction from said second piston means and arranged to take up a position surrounded by the tubular pipe (4) after completion of the travel of the second piston means (11) through said tubular pipe (4), whereafter said valve means (19, 19') are brought to take up a sealing contact against the two inside peripheral portions of the tubular pipe (4), arranged between the mainly parallel piston means (6, 6').

16. Device according to claim 15, wherein adjacent end portions of the valve means (19, 19') are arranged to communicate with a channel for a pressure acting medium in the second piston means (11), said medium, when applied, moving the valve means (19, 19') to a sealing contact position against the tubular pipe (4).

17. Device according to claim 11, wherein said parallel and said second piston means (6, 6', 11) are arranged movably in a surrounding housing (1, 2, 10), said housing (1, 2, 10) consisting of at least two joinable parts (1, 10 and 2), arranged to take up an embracing and sealing contact with the tubular pipe (3), said housing (1, 2, 10) being arranged with guiding channels (5, 5') extending in a mainly perpendicular relationship to the length axis of the tubular pipe (3, 4).

18. Device according to anyone of claims 11, 12, 13, 14, 15, 16 or 17, further comprising explosive charge means (8, 12) arranged adjacent to the end portions of both said parallel and said second piston means (6, 6', 11) for moving each towards the tubular pipe (4), said charge means being initiated by means of activating means (9, 14) in such a way, that the mainly parallel piston means (6, 6') are brought to start and complete their movements, before the travel of the second piston means (11) is initiated.

19. Device according to claim 11, wherein said mainly parallel piston means (6, 6') are arranged with a through hole or a guiding channel (15, 15'), which holes or guiding channels (15, 15') are arranged to take up a coaxial relationship in relation to each other and the length axis of the crosswisely extending piston means (11), when the mainly parallel piston means (6, 6') have completed their travel in direction towards the tubular pipe (4).

20. Device according to claim 19, wherein said piston means (11) extending mainly perpendicularly in relation to the mainly parallel piston means (6, 6') is arranged with the portion directed towards the tubular pipe (4) preferably mainly pointed.

21. Device according to claim 11, wherein said two mainly parallel piston means (6, 6') are arranged tubular with a surrounding relatively thin wall (21, 21'), attached to stronger wall portions (22, 22') directed towards the tubular pipe (4), the second piston means (11) extending mainly perpendicularly in relation to the mainly parallel piston means (6, 6') having the portion directed towards the tubular pipe (4) in such a way, that the piston means (11) during its travel towards and through the tubular pipe (4) is arranged to take up holes for the passage of the second piston means (11) through the peripheral wall portions (21, 21') of the parallel piston means (6, 6').

22. Device according to claim 11, further comprising means arranged to reduce the existing distance between the opposed peripheral portions of the tubular pipe (4) between the mainly parallel piston means (6, 6').

23. Device according to claim 11, wherein said second piston means (11) is arranged removable from a position extending through the tubular pipe (4).

24. Device according to claim 11, wherein said mainly parallel piston means (6, 6') are arranged joined to each other at a portion directed away from the tubular pipe (4), and that said joint is accomplished in a separable way.

25. Device according to claim 11, wherein the device is attached to at least two concentrically arranged tubular pipes (3, 4), the inner pipe (4) and the surrounding pipe (3) in the same operation having two opposed peripheral wall portions removed during the travel of the mainly parallel piston means (6, 6').

26. Device according to claim 11, wherein said mainly parallel piston means (6, 6') are arranged to be rotated to a second angular position in relation to the length axis of the second piston means (11) when said second piston means (11) is removed from the position extending through the tubular pipe (4) and the mainly parallel piston means (6, 6'), whereby the holes for passage of the second piston means (11) in the mainly parallel piston means (6) no longer communicate with the tubular pipe (4).

* * * * *